United States Patent [19]

Fraser et al.

[11] Patent Number: 5,033,938

[45] Date of Patent: * Jul. 23, 1991

[54] REPAIRED TURBINE BLADE AND METHOD OF REPAIRING

[75] Inventors: Michael J. Fraser; Raymond D. Legros, both of Worcestershire, United Kingdom

[73] Assignee: Refurbished Turbine Components Limited, Droitwich, United Kingdom

[ * ] Notice: The portion of the term of this patent subsequent to May 23, 2006 has been disclaimed.

[21] Appl. No.: 488,607

[22] Filed: Mar. 2, 1990

[30] Foreign Application Priority Data

Mar. 4, 1989 [GB] United Kingdom ............... 8904988

[51] Int. Cl.$^5$ ........................... F01D 5/28; B23P 15/04
[52] U.S. Cl. ................... 416/224; 29/402.07; 29/402.13; 29/889.1; 29/889.7; 228/119.
[58] Field of Search ............ 416/224, 241 R; 29/889.1, 889.7, 402.07, 402.08, 402.03, 402.13, 530; 228/119, 165, 199, 231, 232, 238

[56] References Cited

U.S. PATENT DOCUMENTS

| | | | |
|---|---|---|---|
| 4,141,127 | 2/1979 | Cretella et al. | 29/889.1 |
| 4,611,744 | 9/1986 | Fraser et al. | 29/889.1 |
| 4,832,252 | 5/1989 | Fraser | 228/119 |

FOREIGN PATENT DOCUMENTS 0045497 2/1987 Japan ................... 228/119

Primary Examiner—Irene Cuda
Attorney, Agent, or Firm—Armstrong, Nikaido, Marmelstein, Kubovcik & Murray

[57] ABSTRACT

A method of manufacturing or repairing a turbine blade which includes removing a part of a blade such as a damaged part and securing thereto an insert of hard steel which has been hardened prior to securing to the turbine blade and is then welded to the turbine blade temporarily and heat treatment processes may be carried out and it is desired that the insert is hardened to a hardness greater than that eventually required since such hardness may be reduced during the securing of the insert to the turbine blade.

17 Claims, 2 Drawing Sheets

REPAIRED TURBINE BLADE AND METHOD OF REPAIRING

BACKGROUND OF THE INVENTION

1. Field of the Invention

The present invention relates to a method of manufacturing, and a method of repairing turbine blades and is primarily concerned with the manufacture and repair of turbine blades, stator or rotor that are of the type provided with a durable portion on their leading edge, at least in the region of the outer end thereof.

It is the outer end of a turbine blade that during use of the turbine is most prone to damage, either from impact with solid particles or water droplets.

Impact with water droplets tends to occur more in later stages of the turbine where the steam is wetter, i.e. it has cooled compared with the temperature at the high pressure stage of the turbine and hence the water condenses more readily. The combination of the chemicals in the water and the stresses to which the blades are subjected can lead to an effect known as stress corosion cracking, particularly if there is a flaw or transitional weakness present in the blade.

Dense moisture forms in expanding steam and is transported by the steam. Water particles are, after deposition on portions of the turbine, entrained within a main steam flow and can collide with the leading edge of the moving blades.

This is particularly prevelant in water heated by nuclear energy since the temperature of the water is lower than is the case where it is heated by a fossil fuel heating generating plant and hence the blades of the turbine are more prone to water droplet impact and stress corosion cracking.

In order to combat such erosion it is well known to fit a nose or shield of hard material, for example Stellite, to the leading edge of the blades. However the material itself is very expensive and unless perfectly fitted can lead to further problems.

A shield may be attached to a blade by what is known as peripheral welding, peripheral welding can leave a junction of the shield at the radially outermost position where no weld material is present and a cavity or thin gap can exist under the shield. If water penetrates this gap considerable damage can occur, including delamination of the shield from the blade and/or the formation of cracks in the blade.

A Stellite shield may be attached to a blade by welding or by brazing. Welding provides for a stronger or better attachment of the shield to the blade particularly where the shield is in a form of a "nose" of the blade.

When a Stellite shield is attached to a blade by brazing, if there are any voids in the braze the shield may easily become dislodged due to the flexing of the blade during operation with consequential damage to adjacent blades and/or tubes in the condensor which follows the low pressure stage of a turbine.

Stellite is in many respects a very satisfactory material from which to form a nose or shield. However, there are, or can be, problems such as:
1. the high cost of Stellite;
2. the need for very high quality precision welding and subsequent heat treatment;
3. the presence of cobalt in the Stellite.

In some circumstances the presence of cobalt is not a problem, however, if the turbine is to be used in a nuclear power station because of the very high half life of irradiated cobalt, it is an undesirable material.

2. Prior Art

British patent application 8630502 (Publication No. 2,198,667) now U.S. Pat. No. 4,832,252, issued May 23, 1989 proposes the use of an insert made from a material the same as, or similar to, the material of the turbine blade, which insert is hardened before attachment to the turbine blade but which is provided with a zone around the edge thereof, which edge is attached to the turbine blade which is unhardened to facilitate welding of the insert to the turbine blade.

British patent application No. 8901482.3, co-pending U.S. Application Ser. No. 467,864, filed Jan. 2, 1990 in the name of Michael James Fraser, proposes the use of an insert of material having a high carbon content, which insert is welded to the blade and is then subsequently hardened by induction hardening while attached to the blade and once again the welding area zone is kept unaffected by the hardening process.

It is an object of the present invention to provide a new or improved method of repairing turbine blades.

According to one aspect of the present invention, we provide a method of reparing a turbine blade comprising the steps of:
a) removing a piece of the turbine blade
b) hardening a piece of hard steel and forming said piece of hard steel to a shape that conforms to the piece of material removed from the turbine blade to form an insert therefore
c) securing said insert to the turbine blade by welding
d) subjecting the turbine blade to a stress relieving heat treatment process
e) machining the blade as necessary to form the desired shape.

Preferably, said piece of hard steel comprises a tool steel.

Preferably, said hardening process comprises a heat treatment process whereby the piece of hard steel is subjected to a high temperature in excess of 1000° C. and which piece of hard steel is subsequently tempered.

Alternatively, any suitable hardening process may be utilised and if induction hardening is to be used, then the hard steel will have a high carbon content to ensure that a satisfactory hardeness may be obtained.

The piece of hard steel used for the insert may first be subjected to a heat treatment process for stress relief, it may subsequently be shaped to the desired shape so as to conform to the remainder of the blade when secured thereto and after shaping be elevated to a high temperature, for example 1200° C., followed by a first tempering operation at a lower temperature, for example 500° C.

Further tempering operations may then be carried out so as to reduce the hardness of the insert to a level whereby it is sufficiently hard to perform its intended purpose but sufficiently malleable to be attached to the turbine blade without any significant risk of adverse affect to the material during the welding process.

Conveniently when the insert is secured to the turbine blade the edge region of the insert is softened during welding of the insert to the turbine blade so as to form a border region on said insert by means of which the insert is attached to the turbine blade softer than the remainder of said insert or at least the surface thereof.

The welding process itself will inevitably raise the temperature of the insert and a subsequent heat treatment can then be carried out to the blade with insert attached, which has the dual effect of stress relieving the blade and providing a further and final tempering of the insert.

Preferably, after the or each tempering stage carried out on the insert, the hardness is checked so that after the final tempering stage when the insert is attached to the blade, the final hardness of the insert can be predetermined.

Preferably said insert comprises a tool steel comprising approximately 18% tungsten, 4.3% chrome, 1.1% vanadium, 0.75% carbon. The hardening temperature may be between 1200° C. and 1350° C. and after heating the piece of material may be quenched in oil, air or a salt bath and has a temperature of approximately 450° C. to 600° C. and if desired the material may be subjected to a second tempering operation.

It has been believed that it would not be possible to weld a piece of material hardened in such a manner to a turbine blade without causing cracks in the hardened material.

Applicants quite unexpectedly discovered that with careful application of heat during the welding process, the heat is sufficient to render the edge of the insert material somewhat more ductile to enable a satisfactory welded joint to be carried out between the insert and the blade.

The piece of hard steel may be hardened to a hardness of 900 Brinell prior to welding to the turbine blade. After welding and heat treatment of the insert and blade the hardness of the insert will be reduced to a lower value for example approximately 600 Brinell.

The insert may be welded to the blade by the relatively soft or cushion material such as Inconel and if desired the Inconel may be covered with a bead of hard material so as to protect and minimise erosion of the soft weld material during use of the turbine.

The repair process may also include heat treatment processes to relieve stress in the blades caused by the welding operation and such heat treatment process will be carefully controlled to concentrate the stress relief in the area of the weld so as not to cause any undue adverse effect to the hardness of the insert material.

According to another aspect of the present invention, we provide a turbine blade provided with the hardened insert as aforedescribed.

It is further envisaged that after the insert has been attached to a new or a repaired blade, a part or a whole of the insert may be subjected to a further hardening process if it is desired after attachment of the insert to further increase the hardness of the insert.

Such hardening process may incorporate any desired process such as heat treatment, induction hardening, diffusion alloy, chromising etc. It is further envisaged that more than one hardening process may subsequently be applied.

It is envisaged that when repairing a turbine blade the repair process may be carried out while the blade is still in situ on a wheel or rotor or while a stator blade is still in position, or alternatively it may be carried out on a blade which has been removed from the remainder of the array of which it forms a part.

The invention will now be described in more detail by way of example only with reference to the accompanying drawings wherein:

DESCRIPTION OF THE PREFERRED EMBODIMENTS

Figure 1:
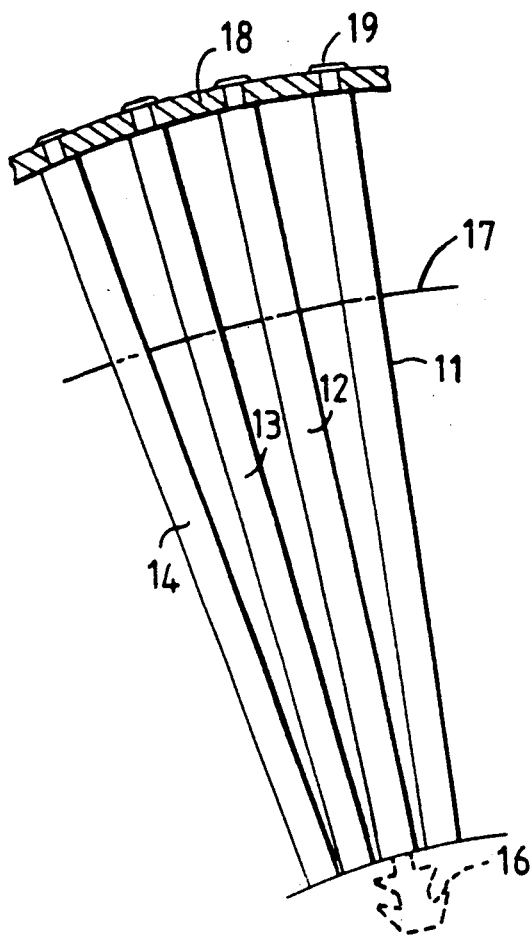
FIG. 1 is a diagrammatic view showing part of a turbine rotor.

Referring first to FIG. 1, a segment of the turbine rotor is shown, the rotor having a rotational axis 10 and a plurality of rotor blades, some of which are shown at 11 to 14.

Each turbine blade 11 to 14 is secured to the rotor shaft by a root portion e.g. a root formed on blade 11 shown at 16 and depending upon the length of the blades other restraining means may be provided such as a lacing wire 17 which passes through aligned apertures in each of the blades 11 to 14 and in some cases a shroud 18 may be provided which is secured to each blade through the co-operation of a tennon, e.g. tennon 19 on blade 11, which extends from the outer end of the blade 11 through an aperture in shroud 18 and is subsequently peened over to firmly secure the blade 11 to the shroud 18.

The whole structure therefore of the rotor is relatively secure which makes dismantling the rotor to remove blades a very time consuming and costly process. Generally speaking in the past repair of turbines, or at least satisfactory repair, has to be carried out by dismantling the blades and returning them to the place of manufacture for repair, techniques are now being developed for providing satisfactory repairs to turbines while the blades remain in situ on the rotor or stator.

Figure 2:
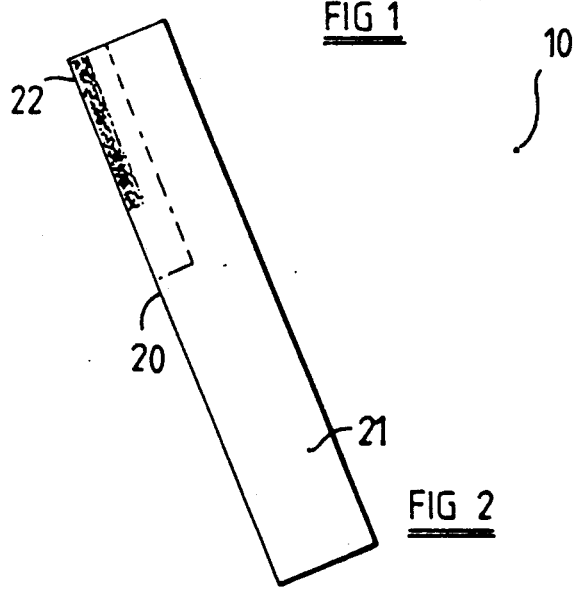
FIG. 2 shows the blade which has been subjected to impact or erosion damage.

Referring now to FIG. 2, a blade is shown in isolation for convenience of illustration only in which the leading edge 20 of the blade 21 is shown to have considerable erosion and cracks in the outer edge region 22.

It is the outer leading edge of the blade that is most prone to such erosion since in practice it's linear speed is considerably greater that the linear speed of the parts of the blade in proximity to the rotor shaft.

To begin the repair process, a piece of the blade is removed by cutting or grinding. The part of the blade removed, which can be seen in FIG. 3, ensuring that not only all the obviously visually damaged edge part of the blade is removed but since hairline cracks can extend some considerable way from an impact site it is ensured that sufficient material is cut away from the blade so that the part of the blade remaining should be completely free from any damage.

Figure 3:
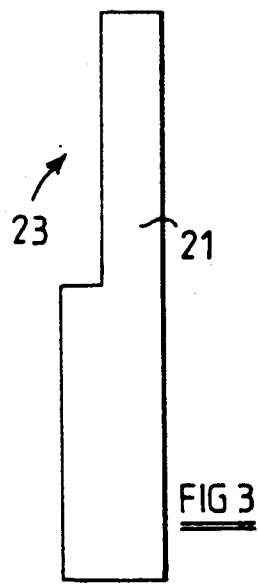
FIG. 3 shows the blade of FIG. 2 from which a piece of material has been removed.

The piece of the blade cut away may leave a cut-out such as the one shown at 23 in FIG. 3.

Figure 4:
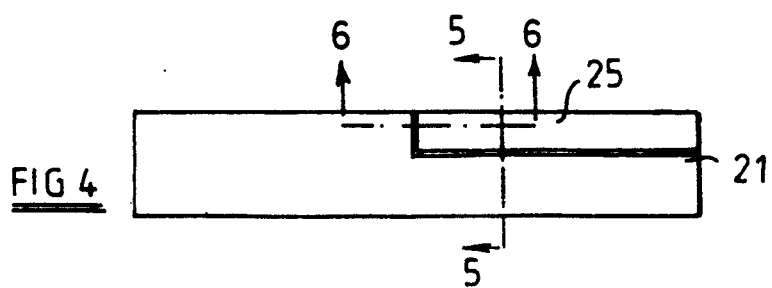
FIG. 4 is a view of the blade shown in FIG. 3 in which a new piece of material has been welded thereto.

Once the piece of material 23 has been removed from the turbine blade 21, it is necessary to fit a new piece of material 25, as shown in FIG. 4.

The piece of material 25 is made from a hard steel and can, for example, be made from a piece of tool steel sold under the designation VEWS200 and which steel comprises 18% tungsten, 4.3% chrome, 1.1% vanadium and 0.75% carbon.

The material is carefully shaped so that when secured to the turbine blade 21 it will conform to the overall shape of the turbine blade and after shaping is subjected to any suitable hardening process.

The whole of the insert is hardened and the preferred hardening process incorporates the steps of heating the insert to a temperature of between 1250° C. to 1290° C. followed by quenching, either in oil or dry air or salt bath at a temperature of approximately 500° C. to 550° C.

The insert 25 may be subjected to a double tempering, the first tempering being carried out at a temperature of approximately 500° C. to 550° C. in a dry air blast, the second tempering operation being carried out at a temperature of 500° C. to 550° C. in a dry air blast.

The insert which has been hardened throughout, or at least on those surfaces which will provide external surfaces once the insert is secured to the blade 21.

Figure 5:
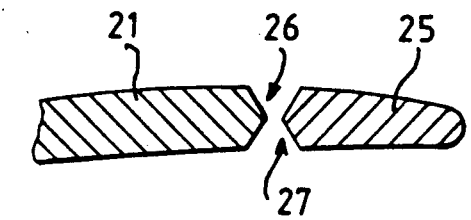
FIG. 5 is a sectional view on the line 5—5 of FIG. 4.

The insert 25 is then placed adjacent to the turbine blade as shown in FIG. 5 and the two V-shaped voids 26 and 27 are filled with weld material so as to securely join the insert 25 to the blade 21.

Figure 6:
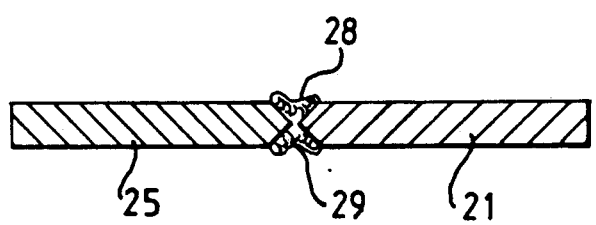
FIG. 6 is a sectional view on the line 6—6 of FIG. 4 (after welding)

The two V-shaped voids 28 and 29 will similarly be filled with weld material as shown in FIG. 6.

Figure 7:
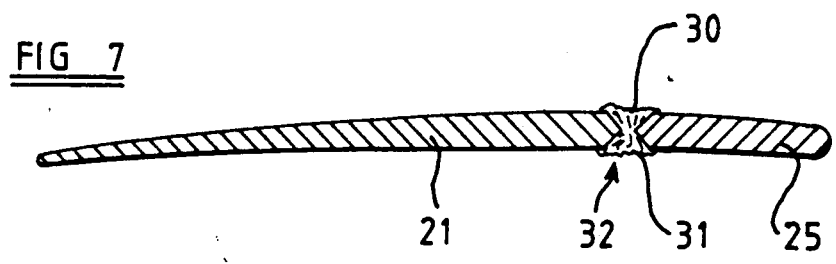
FIG. 7 is a sectional view along the line 5—5 of FIG. 4 (after welding)

Excess weld material as shown in FIG. 7 at 30 and 31 is then removed by grinding and the blade 21, at least in the area of the weld as indicated at 32, will be subjected to a stress relieving heat treatment process and the blade 21 in the area of the weld 32 will be subjected to heat of, for example 500° C., for a predetermined period of time.

The stress relieving heat treatment will also have the effect of tempering the insert.

For this reason, the heat treatment can be carefully controlled as both the area to which it is applied to concentrate stress relief around the weld area and, since it will inevitably affect the hardness of the insert, the hardness of the insert prior to welding to the blade is carefully controlled in order that after the final stress relief or tempering stage when the insert is secured to the blade, the hardness of the insert will be known. Thus it will be appreciated that the hardness of the insert 25 when it is secured to the blade 21 is preferably higher than the value of hardness that is desirable in use of the blade when bearing in mind the conflicting factors of protection against erosion which requires hardness and an ability to absorb shock and prevent propogation of cracks to ensure that the blade 21 has a useful service life.

Figure 8:
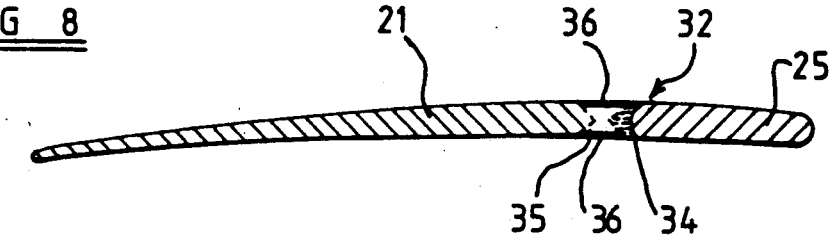
FIG. 8 is an illustration of the repaired blade.

It will be appreciated that the edge 25 of the insert adjacent to the weld area 32 will become extremely hot during the welding process and it is the temperature to which it is subjected during welding that would appear to soften the edge region, shown shaded at 34 in FIG. 8, and the softening of the edge region 34 in combination with the layer of weld material 35 which may comprise Inconel, a relatively soft material, not only enables the hard insert 25 to be satisfactorily welded to the blade but also the softening of the area 34 of the insert 25 gives a progression from the very hard material of the majority of insert 25 through the "soft weld" region 34 to the blade 21. Thus if during use the edge region 25 is subject to impact which could lead to cracks appearing in the nose, then the cracks are less likely to be propogated through to the blade 21 since they are likely to terminate at the less hard material 34 of insert 25 and the cushioning weld layer 35 of Inconel.

The outer surface of the layer of Inconel 35 may if desired be provided with a covering 36 of hard material to prevent the weld layer itself being subjected to erosion.

In some cases particularly where the weld area is situate where damae or errosion is unlikely to occur the bead of hard material may be omitted.

It will be appreciated that the tool steel mentioned is just one example of the hard steel materials that may be used to effect the repair and it will also be appreciated that it may not only be the nose region of the turbine blade that is repaired but it may be a part of the stator where it is also desirable to provide parts of a hard nature for resistance to erosion.

The method of repair of the present invention therefore produces a method providing a hard insert for a turbine blade which has the dual benefit of not only using a material that is considerably cheaper than the normal insert material Stellite, but it doe not have the cobalt content of Stellite and is hence suitable for the repair of turbines which may be used in a nuclear environment.

Furthermore, the softening of the insert in the area of the weld caused by the elevated temperature provided during welding provides an eminently suitable transition zone between the hardened insert and the blade material itself which is of considerable benefit in preventing the propogation of cracks following impact between the leading edge region of the blade and a particle, for example, and the remainder of the blade.

The features disclosed in the foregoing description, or the accompanying drawing, expressed in their specific forms or in terms of a means for performing the disclosed function, or a method or process for attaining the disclosed result, or a class or group of substances or compositions, as appropriate, may, separately or any combination of such features, be utilised for realising the invention in diverse forms thereof.

We claim:

1. A method of repairing a turbine blade comprising the steps of:
   a) removing a piece of the turbine blade;
   b) hardening a piece of hard steel and forming said piece of hard steel to a shape that conforms to the piece of material removed from the turbine blade to form an insert therefore;
   c) securing said insert to the turbine blade by welding;
   d) subjecting the turbine blade to a stress relieving heat treatment process;
   e) machining the blade as necessary to form the desired shape.

2. A method as claimed in claim 1 wherein said insert comprises a tool steel.

3. A method as claimed in claim 1 wherein the hardening process comprises a heat treatment process and wherein said insert is subjected to a temperature in excess of 1000° C.

4. A method as claimed in claim 3 wherein said insert is subjected to a tempering process before securing to the turbine blade.

5. The method as claimed in claim 1 wherein said hardening process comprises induction hardening and wherein said piece of hard steel has a carbon content sufficiently high so as to ensure that a hardness of at least 500 Brinell is obtained.

6. A method as claimed in claim 1 wherein said method comprises subjecting the piece of hard steel to a stress relieving heat treatment process, subsequently shaping the piece of steel to the required shape, elevating the temperature of the piece of hard steel to a degree whereby hardening is achieved and subsequently tempering said hardened piece of material prior to securing to the turbine blade.

7. A method as claimed in claim 6 wherein said high temperature comprises at least 1200° C.

8. A method of repairing a turbine blade as claimed in claim 1 wherein the edge region of the insert is softened during welding of the insert to the turbine blade so as to form a border region on said insert by means of which the insert is attached to the turbine blade softer than the remainder of said insert or at least the surface thereof.

9. A method of repairing a turbine blade as claimed in claim 1 wherein said hardening process is carried out such that said piece of hard steel is hardened to a hardness greater than the hardness eventually required after the repair has been completed.

10. A method of repairing a turbine blade as claimed in claim 9 wherein the piece of hard steel is hardened to approximately 900 Brinell hardness prior to securing to the turbine blade.

11. A method of repairing a turbine blade as claimed in claim 1 wherein said insert comprises a tool steel comprising approximately 18% tungsten 4.3% chrome, 1.1% vanadium and 0.75% carbon.

12. A method of repairing a turbine blade as claimed in claim 1 wherein the hadening process comprises a heat treatment process and wherein said piece of hard steel is raised to a temperature between 1200° C. and 1350° C. and is subsequently quenched in an oil air or salt bath the temperature of which is approximately 450° C. to 600° C.

13. A method of repairing a turbine blade as claimed in claim 1 wherein said insert is secured to the blade by welding by a relatively soft weld material.

14. A method of repairing a turbine blade as claimed in claim 13 wherein said relatively soft material comprises Inconel.

15. A method of repairing a turbine blade as claimed in claim 1 wherein subsequent to said insert being secured to said turbine a part or the whole of said insert may be subjected to a further hardening process such process incorporating any suitable process such as heat treatment, induction hardening, diffusion alloying chromising or any combination of such processes.

16. A turbine blade repaired in accordance with the method as claimed in claim 1.

17. A method of manufacturing a turbine blade wherein a turbine blade blank is formed and a piece of the blade is removed and an insert of hard steel secured thereto in accordance with the method claimed in claim 1.

* * * * *